US012601528B2

(12) United States Patent
Zhao et al.

(10) Patent No.: US 12,601,528 B2
(45) Date of Patent: Apr. 14, 2026

(54) SOLAR ENVIRONMENTAL CONTROL SYSTEM, APPARATUS, AND METHOD RELATING THERETO

(71) Applicant: UNIVERSITY OF NORTH TEXAS, Dallas, TX (US)

(72) Inventors: Weihuan Zhao, Dallas, TX (US); Sheldon Q. Shi, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 463 days.

(21) Appl. No.: 18/157,663

(22) Filed: Jan. 20, 2023

(65) Prior Publication Data

US 2023/0235928 A1 Jul. 27, 2023

Related U.S. Application Data

(60) Provisional application No. 63/301,849, filed on Jan. 21, 2022.

(51) Int. Cl.
| | |
|---|---|
| *F25B 27/00* | (2006.01) |
| *F24S 10/70* | (2018.01) |
| *F24S 60/00* | (2018.01) |
| *F24S 80/20* | (2018.01) |

(52) U.S. Cl.
CPC ............ *F25B 27/007* (2013.01); *F24S 10/70* (2018.05); *F24S 60/00* (2018.05); *F24S 80/20* (2018.05); *F25B 2315/002* (2013.01)

(58) Field of Classification Search
CPC ......... F25B 27/007; F24S 10/70; F24S 60/00; F24S 80/20
USPC ................................................ 126/569, 620
See application file for complete search history.

(56) References Cited

U.S. PATENT DOCUMENTS

| | | | | |
|---|---|---|---|---|
| 4,010,731 | A * | 3/1977 | Harrison | ................. F24V 50/00 165/104.31 |
| 4,308,042 | A * | 12/1981 | Ecker | .................. F24D 11/0221 62/282 |
| 2017/0130998 | A1* | 5/2017 | El-Shaarawi | ......... F25B 27/007 |

OTHER PUBLICATIONS

Wang H, Chen H, Chen W, Sun H, Xu X. Vapor-Liquid Equilibrium Study of LiBr + H2O and LiBr + CaCl2 + H2O Systems. Front Chem. Jan. 23, 2020;7:890. doi: 10.3389/fchem.2019.00890. PMID: 32039138; PMCID: PMC6989471.*

* cited by examiner

*Primary Examiner* — Vivek K Shirsat
(74) *Attorney, Agent, or Firm* — Andrew M. Metrailer; Conley Rose, P.C.

(57) ABSTRACT

A solar environmental control system includes a solar powered apparatus and a heat transfer apparatus. The solar collection apparatus includes a solar collector for absorbing solar energy, a heat storage medium, and a generator. A heat transfer fluid circulates between the solar collector, the heat storage medium, and the generator.

21 Claims, 1 Drawing Sheet

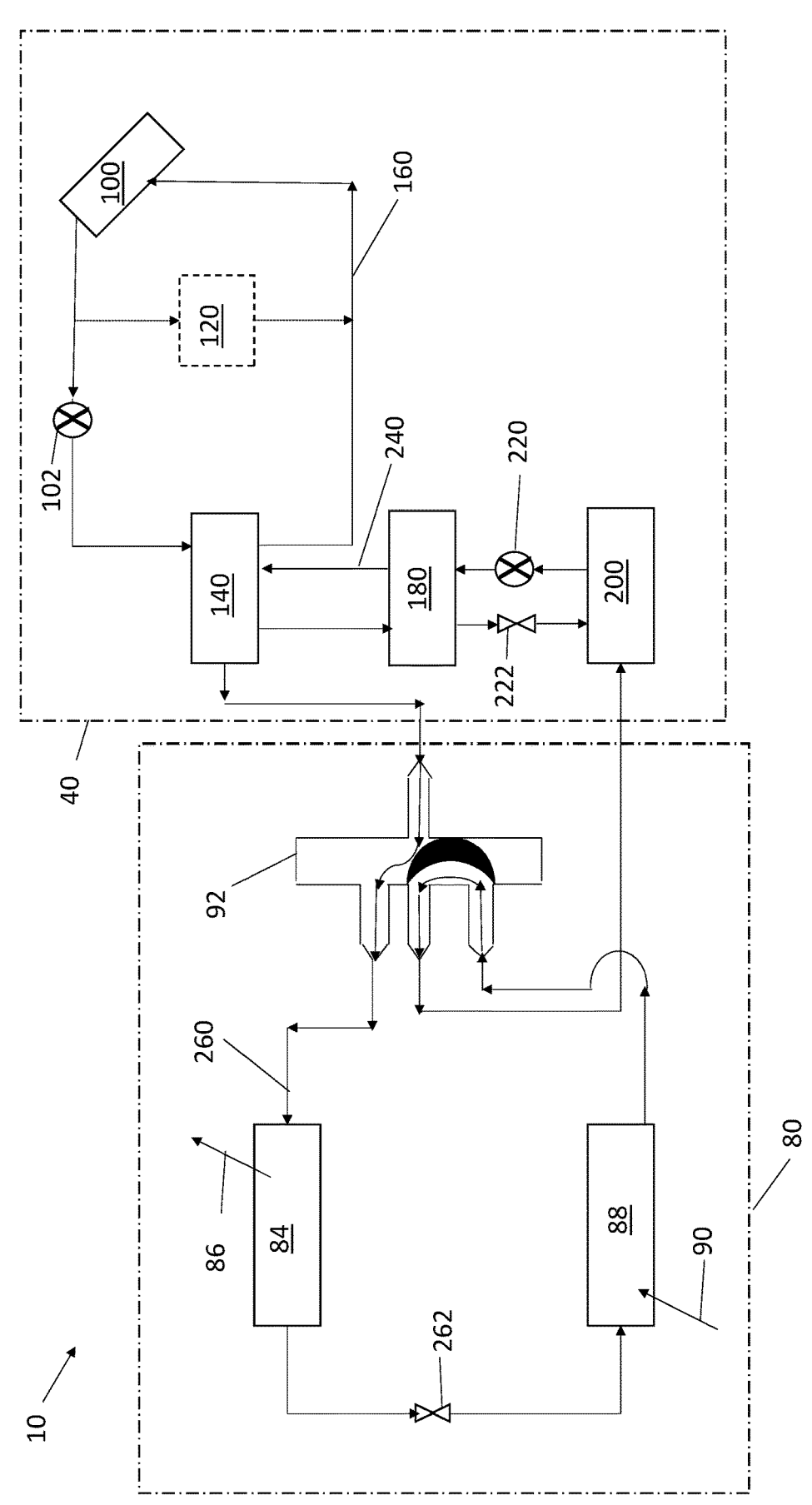

SOLAR ENVIRONMENTAL CONTROL SYSTEM, APPARATUS, AND METHOD RELATING THERETO

CROSS-REFERENCES TO RELATED APPLICATIONS

This application claims the benefit of U.S. Provisional Application No. 63/301,849, filed on Jan. 21, 2022, and entitled "SOLAR-DRIVEN ABSORPTION COOLING/ HEATING SYSTEM WITH ENERGY STORAGE, which is incorporated herein by reference in its entirety for all purposes.

STATEMENT REGARDING FEDERALLY SPONSORED RESEARCH OR DEVELOPMENT

None.

BACKGROUND

With the fast growing of cooling technologies, air conditioners and refrigerators account for nearly ten percent (10%) of total electricity used in buildings in the United States (U.S.). The amount of electricity usage is much higher in hot climate zones (such as Texas). Overall, U.S. consumes more than 500 terawatt-hour (TWh) energies in space cooling and refrigeration annually. Therefore, finding an alternative method to save energy would be desirable. The conventional air conditioning (AC) and refrigeration system use vapor-compression thermodynamic cycle. Much of the energy consumption of the vapor-compression system is from the compressor. Thus, the present vapor-compression system has significant shortcomings.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

The FIGURE is a schematic of a solar environmental control system and apparatus including a solar collection apparatus and a heat transfer apparatus.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

In some embodiments, the solar environmental control system can include a solar collection apparatus that may power a heat transfer apparatus. The heat transfer apparatus includes an absorber used in conjunction with a fluid to circulate between a condenser and evaporator. The fluid, such as a loop fluid, can have an effective amount of ammonia in water or of water in lithium bromide. In some embodiments, the loop fluid can be carbon dioxide in an amine solvent, or nitrogen or methane with an absorbent, such as a zeolite. In this manner, a compressor may be omitted from the solar environmental control system.

The usage of solar energy as the heat input for an absorption system could be unsuited for continuous operation. After the sunset, the heat input from the sun stops. Therefore, a unique thermal energy system using sand or stone in the absorption system can store the solar energy at daytime and shift it to nighttime, achieving a full utilization of solar. The sands or stones are low-cost materials that can be easily accessed.

Moreover, the coefficient of performance (COP) of an absorption cycle is lower than that of conventional vapor-compression cycle. The COP of absorption system is calculated by $COP=Q_{in}/Q_{gen}$ for air conditioner and refrigerator, or $COP=Q_{out}/Q_{gen}$ for a heat pump. In order to increase its COP, the load on generator ($Q_{gen}$) is expected to be reduced. Therefore, placing a regenerator between an absorber and a generator can preheat a working or loop fluid (e.g., $H_2O$—LiBr or $NH_3$—$H_2O$ solution, etc.) before it enters the generator. Thus, it can mitigate the heating load requirement on a generator. Although the COP of an absorption cycle is lower, the proposed system can mainly rely on the solar energy as the heat input, which can almost eliminate the electricity requirement (only a little electricity usage for the pump). Therefore, the absorption cycle has the advantage for significant electricity savings.

The absorption system generally uses a generator, a regenerator, and an absorber to run the thermodynamic cycle, while the vapor-compression system can only require a single compressor. Nevertheless, the three components are not complicated and can be easily arranged inside the system. Besides, the sand and/or stone-based thermal energy system can require a certain amount of mass to achieve long-term operation at night. Nevertheless, because of the high density of sand and/or stone, the volumetric heat capacity of a thermal energy system can be high. Hence, it can have the similar size as conventional hot water or ice storage tanks.

An absorption cycle consumes only about 5 to about 10% electric power compared with a vapor-compression cycle. The AC/heat pump system as disclosed herein can be suitable for large-scale supermarkets, industrial buildings, and other commercial/residential buildings.

In some embodiments, a cooling system can use an absorption cycle with solar irradiation as the heat input. An evacuated solar collector tube may be utilized to increase the solar heat flux, and therefore, increase the temperature of a heat transfer fluid (HTF) for the generator. The evacuated collector tube can help increase the temperature up to between about 150° C. to about 200° C. The HTF can be water or a heat conductive oil. Lesser cost solutions such as $H_2O$—LiBr or $NH_3$—$H_2O$ (traditionally cheaper and more environmentally friendly than halocarbon refrigerants) can be used as the loop fluid for the absorption cycle in any suitable structure, such as residential buildings. While mentioned as specific compositions, other suitable loop and heat transfer fluids can also be used. The absorption system can be used as an air conditioner, a refrigerator or a chiller, and/or as a heat pump. As an example, an evaporator can cool down indoor space in summer. A reversing valve may be installed to change the working fluid direction in winter, and thus, the evaporator can become a condenser to warm an indoor space, and convert an air conditioner (AC) to a heat pump. Typically, the pump may be the only component requiring electricity in the cycle. However, often the electricity consumption of a pump is much less (almost negligible) compared to that of a compressor. Moreover, an absorption cycle can eliminate the usage of halocarbon refrigerants, which can benefit the environment and help mitigate greenhouse gas (GHG) emissions. Additionally, a sand and stone-based thermal energy system (TES) enables the usage of solar energy at nighttime. In some embodiments, the use of solar energy as the heat input can eliminate the electricity consumption from a compressor, and thereby achieving significant energy savings. Generally, the only component that may require electricity is the pump in the cycle. What is more, use of a reversing valve enables the absorption cycle to achieve both heating and cooling functions allowing the easy arrangement of the generator, regenerator, and absorber inside the system. The solar-driven absorption system as disclosed herein may create a new avenue for an AC unit, a refrigerator, and/or a heat pump suitable for large-scale supermarkets, industrial buildings, and other commercial/residential buildings.

In some embodiments, an absorption system can also be used for heating purpose. A reversing valve can convert an AC into a heater. When put in heating mode, the reversing valve is flipped, and the flow of working fluid through the system changes direction. The evaporator coils may become condenser coils, while the condenser coils now may become evaporator coils. Instead of venting the hot air outside, cold air may be expelled while the warmed air can be pumped into the room for space heating in winter. Thus, the AC unit can become a heat pump. Advantages of the combined air conditioning and heating system are (a) using the same thermodynamic cycle to accomplish both heating and cooling purposes, which can save space and money due to the elimination of the additional space heater, and (b) using less electricity with a heat pump than a regular resistance heater.

In some embodiments, the absorption cycle may only consume about 5 to about 10 percent (%) of electric power compared with vapor-compression cycle. As an example, a 1,200-ft$^2$ (110 meter squared (m$^2$)) building, such as Zero-Energy (ZØE) lab at University of North Texas of Denton, Texas, can require about 22,000 Btu per hour (6.45 kWh per hour (kWh/h)) AC capacity. Thus, the conventional AC unit (vapor-compression cycle) electricity consumption (electricity input) can be about 5,500 Btu/h (1.61 kWh/h) based on the coefficient of performance (COP) of an AC unit of about 4. Therefore, the absorption cycle electricity consumption can be only about 275 to about 550 Btu/h (about 0.08 to about 0.16 kWh/h) due to the small electricity consumption of a pump. In some embodiments, a TES may require an additional pump. In such an instance, the electricity consumption can be about 550 to about 1,100 Btu/h (about 0.16 to about 0.32 kWh/h) for a cooling system at least partially or substantially powered by solar absorption, except for pumps.

As an example, eliminating a compressor with the embodiments disclosed herein can reduce electricity usage by about 1.29 to about 1.45 kilowatt-hour per hour (kWh/h) compared to a conventional AC unit for a 110 m$^2$ building. The cost savings in some embodiments of an absorption cooling system is about $278 to about $313 United States dollar (USD) for the summer season based on the unit electricity price of 10.0 cents USD/kWh in Texas for an AC unit operated for 24 hours per day for three summer months. Compared to a conventional AC unit, in some embodiments the absorption system can eliminate the compressor, but have additional generator, regenerator and absorber components. Furthermore, a TES can also be added, e.g., about 2.5 to about 4.0 m$^3$ TES tank is required for a 1,200-ft$^2$ (110 m$^2$) building. The capital cost of an absorption cooling system of some embodiments can be about $1,000 USD higher than that of a conventional AC unit, and the payback period can be approximately three years.

In some embodiments, the exemplary solar environmental control system can utilize a first or heat transfer fluid circulating between a solar collector, a heat storage medium, and a generator. The first fluid may include water or a heat conductive oil. The first fluid 160 can be at a temperature of about 100 degrees Celsius (° C.) to about 200° C., about 120° C. to about 200° C., about 110° C. to about 150° C., or about 120° C. to about 140° C. The first fluid 160 can be at a temperature of at least about 80° C., about 100° C., about 110° C., about 120° C., about 130° C., or about 140° C., or at a temperature of no more than about 220° C., about 200° C., about 190° C., about 180° C., or about 170° C.

In some embodiments, the exemplary solar environmental control system can utilize a second or loop fluid circulating through an absorber and a regenerator. Generally, the second fluid can absorb and release these gases, thereby mimicking a compressor function. For example, the second fluid can comprise an absorber fluid and a working fluid, where the working fluid can be absorbed and released by the absorber fluid. In some embodiments, the second fluid can include an effective amount of ammonia in water or an effective amount of water in lithium bromide. In this embodiment, the ammonia can be absorbed and released from water or the water can be absorbed and released from lithium bromide. In some embodiments, carbon dioxide in an amine solvent, such as monoethanolamine (MEA), piperazine, or other ionic liquids and may operate at high pressure of at least about 1,000 kilopascal (kPa) during, e.g., compression. In this embodiment, the carbon dioxide can be absorbed and released from the amine solvent. In some embodiments, the absorption can occur at low pressure. As an example, nitrogen or methane can be absorbed by a zeolite. The zeolite can be any suitable material, such as aluminum, silicon, and oxygen, and optionally additional components. Usually, the second fluid, such as an effective amount of ammonia in water or water in lithium bromide, can be at a temperature of about 10° C. to about 160° C., about 20° C. to about 130° C., about 25° C. to about 120° C., or about 60° C. to about 120° C., or at a temperature of about 10° C. to about 60° C., about 20° C. to about 50° C., about 20° C. to about 40° C., or about 25° C. to about 35° C. The second fluid can be at a temperature of at least about 0° C., about 10° C., about 20° C., about 30° C., about 40° C., or about 50° C., or at a temperature of no more than about 140° C., about 130° C., about 120° C., about 110° C., or about 100° C.

At a generator, the second fluid can be at a temperature of about 60° C. to about 180° C., 65° C. to about 160° C., about 65° C. to about 120° C., or about 80° C. to about 120° C., and a pressure of about 100 kPa to about 13,200 kPa, about 205 kPa to about 9,000 kPa, about 100 kPa to about 210 kPa, about 1,010 kPa to about 1,520 kPa, or about 9,000 kPa to about 13,200 kPa. At the generator, the second fluid can have a temperature of at least about 60° C., about 70° C., or about 80° C., or no more than about 180° C., about 170° C., or about 160° C. The second fluid can have a pressure of at least about 90 kPa, about 200 kPa, about 1,000 kPa, or about 9,000 kPa and no more than about 14,000 kPa, about 9,000 kPa, about 1520 kPa, or about 205 kPa. At an absorber, the second fluid can be at a temperature of about 20° C. to about 60° C., about 30° C. to about 50° C., about 25° C. to about 35° C., or about 80° C. to about 120° C., and a pressure of about 100 kPa to about 13,200 kPa, about 205 kPa to about 9,000 kPa, about 100 kPa to about 210 kPa, about 1,010 kPa to about 1,520 kPa, or about 9,000 kPa to about 13,200 kPa. At a generator, the second fluid can have a temperature of at least about 60° C., about 70° C., or about 80° C., or no more than about 180° C., about 170° C., or about 160° C. The second fluid can have a pressure of at least about 90 kPa, about 200 kPa, about 1,000 kPa, or about 9,000 kPa and no more than about 14,000 kPa, about 9,000 kPa, about 1520 kPa, or about 205 kPa.

In some embodiments, the exemplary solar environmental control system can utilize a third or a working fluid circulating through the heat transfer apparatus. The third fluid can be ammonia or water and operate at a temperature of about –30° C. to about 50° C., about –20° C. to about 40° C., or about –10° C. to about 35° C., and a pressure of about 1 kPa to about 13,200 kPa, about 100 kPa to about 210 kPa, about 400 kPa to about 610 kPa, about 1,010 kPa to about 1,520 kPa, about 2,000 kPa to about 3,600 kPa, or about 9,000 kPa to about 13,200 kPa. The temperature can be at least about –30° C., about –20° C., or about –10° C. or no more than about 50° C., about 40° C., or about 35° C. The pressure can be at least about 1 kPa, about 100 kPa, or about 210 kPa, or no more than about 13,200 kPa, about 3,600 kPa, or about 1,520 kPa.

In some embodiments, the second fluid can be a water-lithium bromide ($H_2O$—LiBr) solution where $H_2O$ is the working fluid and LiBr is the absorber. At a generator, the second fluid can be a temperature of about 60° C. to about 180° C. or about 80° C. to about 120° C., a temperature of at least about 60° C. or about 80° C., or a temperature of no more than about 180° C. or about 120° C. At the generator, the second fluid can have a pressure of about 1 kPa to about 1,010 kPa or about 100 kPa to about 205 kPa, a pressure of at least about 1 kPa or about 100 kPa, or a pressure of no more than about 1,010 kPa or about 205 kPa. At an absorber, the second fluid can be a temperature of about 20° C. to about 60° C. or about 30° C. to about 50° C., a temperature of at least about 20° C. or about 30° C., or a temperature of no more than about 60° C. or about 50° C. At the absorber, the second fluid can have a pressure of about 1 kPa to about 10 kPa or about 1 kPa to about 5 kPa, a pressure of at least about 0.1 kPa or about 1 kPa, or a pressure of no more than about 10 kPa or about 1 kPa. Generally, a regenerator can be operated at a temperature of about 30° C. to about 80° C. or about 45° C. to about 65° C., a temperature of at least about 30° C. or about 45° C., or a temperature of no more than about 80° C. or about 65° C. A condenser can be operated at a temperature of about 20° C. to about 50° C. or about 27° C. to about 32° C. and a pressure as disclosed for the generator discussed above in this paragraph. An evaporator can be operated at a temperature of about 0° C. to about 30° C. or about 4° C. to about 15° C. and a pressure as disclosed for the absorber discussed above in this paragraph.

In some embodiments, the second fluid can be an ammonia-water ($NH_3$—$H_2O$) solution where $NH_3$ is the working fluid and $H_2O$ is the absorber. At a generator, the second fluid can be a temperature of about 60° C. to about 180° C. or about 65° C. to about 120° C., a temperature of at least about 60° C. or about 65° C., or a temperature of no more than about 180° C. or about 120° C. At the generator, the second fluid can have a pressure of about 100 kPa to about 2,000 kPa or about 1,010 kPa to about 1,520 kPa, a pressure of at least about 100 kPa or about 1,000 kPa, or a pressure of no more than about 2,000 kPa or about 1,520 kPa. At an absorber, the second fluid can be a temperature of about 20° C. to about 60° C. or about 35° C. to about 45° C., a temperature of at least about 20° C. or about 30° C., or a temperature of no more than about 60° C. or about 50° C. At the absorber, the second fluid can have a pressure of about 1 kPa to about 1,000 kPa or about 400 kPa to about 600 kPa, a pressure of at least about 100 kPa or about 400 kPa, or a pressure of no more than about 1,000 kPa or about 600 kPa. Generally, a regenerator can be operated at a temperature of about 40° C. to about 80° C. or about 50° C. to about 65° C., a temperature of at least about 40° C. or about 50° C., or a temperature of no more than about 80° C. or about 65° C. A condenser can be operated at a temperature of about 20° C. to about 50° C., about 30° C. to about 40° C., or about 35° C., and a pressure as disclosed for the generator discussed above in this paragraph. An evaporator can be operated at a temperature of about –20° C. to about 20° C. or about –10° C. to about 10° C. and a pressure as disclosed for the absorber discussed above in this paragraph.

In some embodiments, the second fluid can be a carbon dioxide ($CO_2$) in combination with an amine-based solvent such as monoethanolamine (MEA) or piperazine (PZ). The working fluid can be $CO_2$ and $H_2O$ as the amine-based solvent. At a generator, the second fluid can be a temperature of about 60° C. to about 180° C. or about 90° C. to about 160° C., a temperature of at least about 60° C. or about 90° C., or a temperature of no more than about 180° C. or about 160° C. At the generator, the second fluid can have a pressure of about 2,000 kPa to about 14,000 kPa or about 9,000 kPa to about 13,200 kPa, a pressure of at least about 1,000 kPa or about 9,000 kPa, or a pressure of no more than about 14,000 kPa or about 13,200 kPa. At an absorber, the second fluid can be a temperature of about 20° C. to about 50° C. or about 30° C. to about 35° C., a temperature of at least about 20° C. or about 30° C., or a temperature of no more than about 50° C. or about 35° C. At the absorber, the second fluid can have a pressure of about 1,000 kPa to about 5,000 kPa or about 2,000 kPa to about 3,600 kPa, a pressure of at least about 1,000 kPa or about 2,000 kPa, or a pressure of no more than about 5,000 kPa or about 3,600 kPa. Generally, a regenerator can be operated at a temperature of about 40° C. to about 80° C., about 50° C. to about 70° C., or about 65° C., a temperature of at least about 40° C. or about 50° C., or a temperature of no more than about 80° C. or about 70° C. A condenser can be operated at a temperature of about 60° C. to about 180° C. or about 90° C. to about 160° C., and a pressure as disclosed for the generator discussed above in this paragraph. An evaporator can be operated at a temperature of about –20° C. to about 20° C., about –10° C. to about 10° C., or about 0° C. and a pressure as disclosed for the absorber discussed above in this paragraph.

In some embodiments, an exemplary solar environmental control system is depicted in the FIGURE. The solar environmental control system 10 may include a solar collection apparatus 40 and a heat transfer apparatus 80. Generally, the solar collection apparatus 40 includes a solar collector 100 for absorbing solar energy, a pump or a first pump 102, a heat storage medium 120, a generator 140, a regenerator 180, an absorber 200, at least one pump 220, and a valve 222. The solar collector 100 may include an evacuated collector tube, a solar panel, or any other suitable heat collection apparatus. The heat storage medium 120 can be any suitable medium, and may be at least one of sand, stone, or a combination thereof. In some embodiments, a first or heat transfer fluid 160 circulates between the solar collector 100, the heat storage medium 120, and a generator 140.

In some embodiments, the regenerator 180 may preheat a second or a loop fluid 240 prior to entering the generator 140. The regenerator 180 can operate at a temperature of about 30° C. to about 80° C., about 40° C. to about 70° C., or about 45° C. to about 65° C. The pump 102 can circulate the first fluid 160 and the least one pump 220, which can be two pumps, can circulate the second fluid 240.

The heat transfer apparatus 80 can include a condenser 84, an evaporator 88, and a reversing valve 92. A third or working fluid 260 can circulate through a valve 262 between the condenser 84 and the evaporator 88 and to the reversing valve 92. A space heating fluid stream 86 can be passed through the condenser 84 to, e.g., heat a space and a space cooling fluid stream 90 can be passed through the evaporator 88 to, e.g., cool a space. The condenser 84 can be operated at a temperature of about 20° C. to about 50° C., or about 25° C. to about 40° C., a temperature of at least about 20° C. or about 25° C., or a temperature of no more than about 50° C. or about 40° C. The condenser 84 can be operated at a pressure of about 100 kPa to about 14,000 kPa or about 205 kPa to about 13,200 kPa, a pressure of at least about 100 kPa or about 205 kPa, or a pressure of no more than about 14,000 kPa or about 13,200 kPa. The evaporator 88 can be operated at a temperature of about −20° C. to about 30° C., or about −10° C. to about 15° C., a temperature of at least about −20° C. or about −10° C., or a temperature of no more than about 30° C. or about 15° C. The condenser 84 can be operated at a pressure of about 0 kPa to about 14,000 kPa or about 1 kPa to about 13,200 kPa, a pressure of at least about 1 kPa or about 400 kPa, or a pressure of no more than about 14,000 kPa or about 9,000 kPa. The reversing valve 92 can reverse the flow of the working fluid 260 so the heat transfer apparatus 80 can function as, e.g., an air conditioner or a heat pump.

Having described various systems and methods herein, certain embodiments can include, but are not limited to:

In a first aspect, a solar environmental control system, the solar environmental control system comprises: a solar powered apparatus; and a heat transfer apparatus, wherein the solar collection apparatus, comprises: a solar collector for absorbing solar energy; a heat storage medium; and a generator, wherein a heat transfer fluid circulates between the solar collector, the heat storage medium, and the generator.

A second aspect can include the solar environmental control system of the first aspect, wherein the solar powered apparatus further comprises: a regenerator; an absorber; and at least one pump.

A third aspect can include the solar environmental control system of the first or second aspect, further comprising a loop fluid circulating through the absorber, the regenerator, and the generator and a working fluid circulating through the heat transfer apparatus.

A fourth aspect can include the solar environmental control system of any one of the first to third aspects, wherein the heat transfer apparatus comprises a condenser, an evaporator, and a reversing valve.

A fifth aspect can include the solar environmental control system of any one of the first to fourth aspects, wherein the heat transfer fluid comprises water or a heat conductive oil, the loop fluid comprises an effective amount of ammonia in water or an effective amount of water in lithium bromide, and the working fluid comprises ammonia or water.

A sixth aspect can include the solar environmental control system of any one of the first to fifth aspects, wherein the heat transfer fluid is at a temperature of about 100° C. to about 200° C., about 120° C. to about 200° C., or about 120° C. to about 140° C.

A seventh aspect can include the solar environmental control system of any one of the first to sixth aspects, wherein the loop fluid is at a temperature of about 10° C. to about 160° C., about 20° C. to about 130° C., or about 25° C. to about 120° C.

An eighth aspect can include the solar environmental control system of any one of the first to seventh aspects, wherein the working fluid is at a temperature of about −30° C. to about 50° C., about −20° C. to about 40° C., or about −10° C. to about 35° C.

A ninth aspect can include the solar environmental control system of any one of the first to eighth aspects, wherein the heat storage medium comprises sand, stone, or a combination thereof, and the at least one pump comprises two pumps.

A tenth aspect can include the solar environmental control system of any one of the first to ninth aspects, wherein the regenerator preheats the loop fluid prior to entering the generator.

An eleventh aspect can include the solar environmental control system of any one of the first to tenth aspects, wherein that loop fluid at the generator operates at a pressure of about 100 kPa to about 13,200 kPa, about 205 kPa to about 9,000 kPa, about 100 kPa to about 210 kPa, about 1,010 kPa to about 1,520 kPa, or about 9,000 kPa to about 13,200 kPa.

A twelfth aspect can include the solar environmental control system of any one of the first to eleventh aspects, wherein the regenerator operates at a temperature of about 30° C. to about 80° C., about 40° C. to about 70° C., or about 45° C. to about 65° C.

A thirteenth aspect can include the solar environmental control system of any one of the first to twelfth aspects, wherein the loop fluid at the absorber operates at a pressure of about 100 kPa to about 13,200 kPa, about 205 kPa to about 9,000 kPa, about 100 kPa to about 210 kPa, about 1,010 kPa to about 1,520 kPa, or about 9,000 kPa to about 13,200 kPa.

A fourteenth aspect can include the solar environmental control system of any one of the first to thirteenth aspects, wherein the solar collector comprises an evacuated collector tube or a solar panel.

A fifteenth aspect can include the solar environmental control system of any one of the first to fourteenth aspects, wherein the loop fluid comprises carbon dioxide and an amine solvent.

A sixteenth aspect can include the solar environmental control system of any one of the first to fifteenth aspects, wherein the amine solvent comprises an ionic liquid of monoethanolamine or piperazine.

A seventeenth aspect can include the solar environmental control system of any one of the first to sixteenth aspects, wherein the loop fluid comprises nitrogen and the solar powered apparatus further comprises an absorber including a zeolite.

An eighteenth aspect can include the solar environmental control system of any one of the first to seventeenth aspects, wherein the loop fluid comprises methane and the solar powered apparatus further comprises an absorber including a zeolite.

A nineteenth aspect can include the solar environmental control system of any one of the first to eighteenth aspects, wherein the loop fluid comprising carbon dioxide is at a pressure of at least about 1,000 kPa during compression.

A twentieth aspect can include the solar environmental control system of any one of the first to nineteenth aspects, wherein the zeolite comprises aluminum, silicon, and oxygen.

In a twenty first aspect, a solar environmental control apparatus, the solar environmental control apparatus comprises: a solar collector, a first pump, a heat storage medium, and a generator in communication via a first fluid; the generator, a regenerator, a second pump, and an absorber in communication via a second fluid; and a condenser, an evaporator, and a reversing valve in communication via a third fluid.

A twenty second aspect can include the solar environmental control apparatus of the twenty first aspect, wherein the solar collector comprises an evacuated collector tube or a solar panel.

A twenty third aspect can include the solar environmental control apparatus of the twenty first or twenty second aspect, wherein the heat storage medium comprises at least one of sand, stone, or a combination thereof.

In a twenty fourth aspect, a method of controlling the temperature of an environment, the method comprises: circulating a first fluid through a solar collector and a generator for heating a second fluid, in turn, heating a third fluid for circulating through at least one of a condenser or an evaporator; with a proviso that the method operates without a compressor.

A twenty fifth aspect can include the method of controlling the temperature of an environment of the twenty fourth aspect, wherein the first fluid is at a temperature of about 100° C. to about 200° C., about 120° C. to about 200° C., or about 120° C. to about 140° C.

A twenty sixth aspect can include the method of controlling the temperature of an environment of the twenty fourth or twenty fifth aspect, wherein the second fluid is at a temperature of about 10° C. to about 160° C., about 20° C. to about 130° C., or about 25° C. to about 120° C.

A twenty seventh aspect can include the method of controlling the temperature of an environment of any one of the twenty fourth to twenty sixth aspects, wherein the third fluid is at a temperature of about –30° C. to about 50° C., about –20° C. to about 40° C., or about –10° C. to about 35° C.

A twenty eighth aspect can include the method of controlling the temperature of an environment of any one of the twenty fourth to twenty seventh aspects, wherein the second fluid comprises carbon dioxide and an amine solvent.

A twenty ninth aspect can include the method of controlling the temperature of an environment of any one of the twenty fourth to twenty eighth aspects, wherein the amine solvent comprises an ionic liquid of monoethanolamine or piperazine.

A thirtieth aspect can include the method of controlling the temperature of an environment of any one of the twenty fourth to twenty ninth aspects, wherein the second fluid comprises nitrogen and the solar powered apparatus further comprises an absorber including a zeolite.

A thirty first aspect can include the method of controlling the temperature of an environment of any one of the twenty fourth to thirtieth aspects, wherein the second fluid comprises methane and the solar powered apparatus further comprises an absorber including a zeolite.

A thirty second aspect can include the method of controlling the temperature of an environment of any one of the twenty fourth to thirty first aspects, wherein the second fluid comprising carbon dioxide is at a pressure of at least about 1,000 kPa during compression.

A thirty third aspect can include the method of controlling the temperature of an environment of any one of the twenty fourth to thirty second aspects, wherein the zeolite comprises aluminum, silicon, and oxygen.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. As used herein, the term "and/or" can mean one, some, or all elements depicted in a list. As an example, "A and/or B" can mean A, B, or a combination of A and B.

What is claimed is:

1. A solar environmental control system, comprising:
   a solar powered apparatus; and
   a heat transfer apparatus,
   wherein the solar powered apparatus comprises:
      a solar collector for absorbing solar energy;
      a heat storage medium;
      a generator, wherein a heat transfer fluid circulates between the solar collector, the heat storage medium, and the generator;
      a regenerator;
      an absorber; and
      at least one pump, wherein the heat transfer fluid is at a temperature of about 100° C. to about 200° C., and wherein the regenerator operates at a temperature of about 30° C. to about 80° C.

2. The solar environmental control system according to claim 1, further comprising a loop fluid circulating through the absorber, the regenerator, and the generator and a working fluid circulating through the heat transfer apparatus.

3. The solar environmental control system according to claim 1, wherein the heat transfer apparatus comprises a condenser, an evaporator, and a reversing valve.

4. The solar environmental control system according to claim 2, wherein the heat transfer fluid comprises water or a heat conductive oil, the loop fluid comprises an effective amount of ammonia in water or an effective amount of water in lithium bromide, and the working fluid comprises ammonia or water.

5. The solar environmental control system according to claim 2, wherein the loop fluid is at a temperature of about 10° C. to about 160° C.

6. The solar environmental control system according to claim 2, wherein the working fluid is at a temperature of about –30° C. to about 50° C.

7. The solar environmental control system according to claim 1, wherein the heat storage medium comprises sand, stone, or a combination thereof and the at least one pump comprises two pumps.

8. The solar environmental control system according to claim 2, wherein the regenerator preheats the loop fluid prior to entering the generator.

9. The solar environmental control system according to claim 2, wherein the loop fluid at the generator operates at a pressure of about 100 kPa to about 13,200 kPa.

10. The solar environmental control system according to claim 2, wherein the loop fluid at the absorber operates at a pressure of about 100 kPa to about 13,200 kPa.

11. The solar environmental control system according to claim 1, wherein the solar collector comprises an evacuated collector tube or a solar panel.

12. The solar environmental control system according to claim 2, wherein the loop fluid comprises carbon dioxide and an amine solvent.

13. The solar environmental control system according to claim 12, wherein the amine solvent comprises an ionic liquid of monoethanolamine or piperazine.

14. The solar environmental control system according to claim 2, wherein the loop fluid comprises nitrogen and the solar powered apparatus further comprises the absorber including a zeolite.

15. The solar environmental control system according to claim 2, wherein the loop fluid comprises methane and the solar powered apparatus further comprises the absorber including a zeolite.

16. A solar environmental control system, comprising:
a solar powered apparatus; and
a heat transfer apparatus,
wherein the solar powered apparatus comprises:
    a solar collector for absorbing solar energy;
    a heat storage medium;
    a generator, wherein a heat transfer fluid circulates between the solar collector, the heat storage medium, and the generator;
    a regenerator;
    an absorber;
    at least one pump;
    a loop fluid circulating through the absorber, the regenerator, and the generator; and
    a working fluid circulating through the heat transfer apparatus,
wherein the heat transfer fluid is at a temperature of about 100° C. to about 200° C., and
wherein the loop fluid is at a temperature of about 10° C. to about 160° C.

17. The solar environmental control system according to claim 16, wherein the working fluid is at a temperature of about –30° C. to about 50° C.

18. The solar environmental control system according to claim 16, wherein the heat storage medium comprises sand, stone, or a combination thereof and the at least one pump comprises two pumps.

19. The solar environmental control system according to claim 16, wherein the loop fluid at the generator operates at a pressure of about 100 kPa to about 13,200 kPa.

20. A solar environmental control system, comprising:
a solar powered apparatus; and
a heat transfer apparatus,
wherein the solar powered apparatus comprises:
    a solar collector for absorbing solar energy;
    a heat storage medium;
    a generator, wherein a heat transfer fluid circulates between the solar collector, the heat storage medium, and the generator;
    a regenerator;
    an absorber;
    at least one pump;
    a loop fluid circulating through the absorber, the regenerator, and the generator; and
    a working fluid circulating through the heat transfer apparatus,
wherein the heat transfer fluid is at a temperature of about 100° C. to about 200° C., and
wherein the loop fluid comprises carbon dioxide and an amine solvent.

21. The solar environmental control system according to claim 20, wherein the amine solvent comprises an ionic liquid of monoethanolamine or piperazine.

* * * * *